United States Patent [19]

Shantzis

[11] Patent Number: 5,031,829
[45] Date of Patent: Jul. 16, 1991

[54] SEPARATED WASTE COLLECTION SYSTEM FOR MULTI-STORY BUILDING

[76] Inventor: Mark Shantzis, 6061 Collins Ave., Suite 19D, Miami Beach, Fla. 33140

[21] Appl. No.: 556,347

[22] Filed: Jul. 23, 1990

[51] Int. Cl.$^5$ .......................... B65G 11/04; B07C 5/00
[52] U.S. Cl. ..................................... 232/43.2; 232/44; 209/706; 209/932
[58] Field of Search .................... 232/43.1, 43.2, 43.4, 232/43.5, 44; 209/932, 933, 706, 702, 655

[56] References Cited

U.S. PATENT DOCUMENTS

| | | | |
|---|---|---|---|
| 2,177,328 | 10/1939 | Pender | 232/44 |
| 2,792,171 | 5/1957 | Rosset | 232/44 |
| 3,713,581 | 1/1973 | Mullens | 232/43.1 |
| 3,893,615 | 7/1975 | Johnson | 232/43.2 |
| 4,114,776 | 9/1978 | Pluss | 232/43.1 |
| 4,640,403 | 2/1987 | McDermott | 232/44 |
| 4,987,988 | 1/1991 | Messina | 232/43.2 |

FOREIGN PATENT DOCUMENTS 2407482  8/1975  Fed. Rep. of Germany ..... 232/43.2

OTHER PUBLICATIONS

C. Benton, R. Fox: Commingling Recycling Tested in Apartments in Resource Recycling, Jun. 1990, p. 48.
J. Freedman, B. Nelson: Planning for Recycling in High-Rise Housing Resource Recycling, May 1990, p. 51.
J. Hyde: An Experimental Apartment Recycling Program Resource Recycling, Jun. 1990, p. 30.

Primary Examiner—Gary L. Smith
Assistant Examiner—Flemming Saether
Attorney, Agent, or Firm—Alvin S. Blum

[57] ABSTRACT

A system uses a single chute in a multi-story building to collect into separate large receptacles different categories of wastes already separated by the tenant for recycling. A turntable carries a large receptacle for each category of waste. Control means on each floor enables a tenant to operate the turntable to position a selected receptacle beneath the turntable to receive a particular category of waste. A microprocessor controller and interlocks on the access doors prevent conflicts between floors.

32 Claims, 1 Drawing Sheet

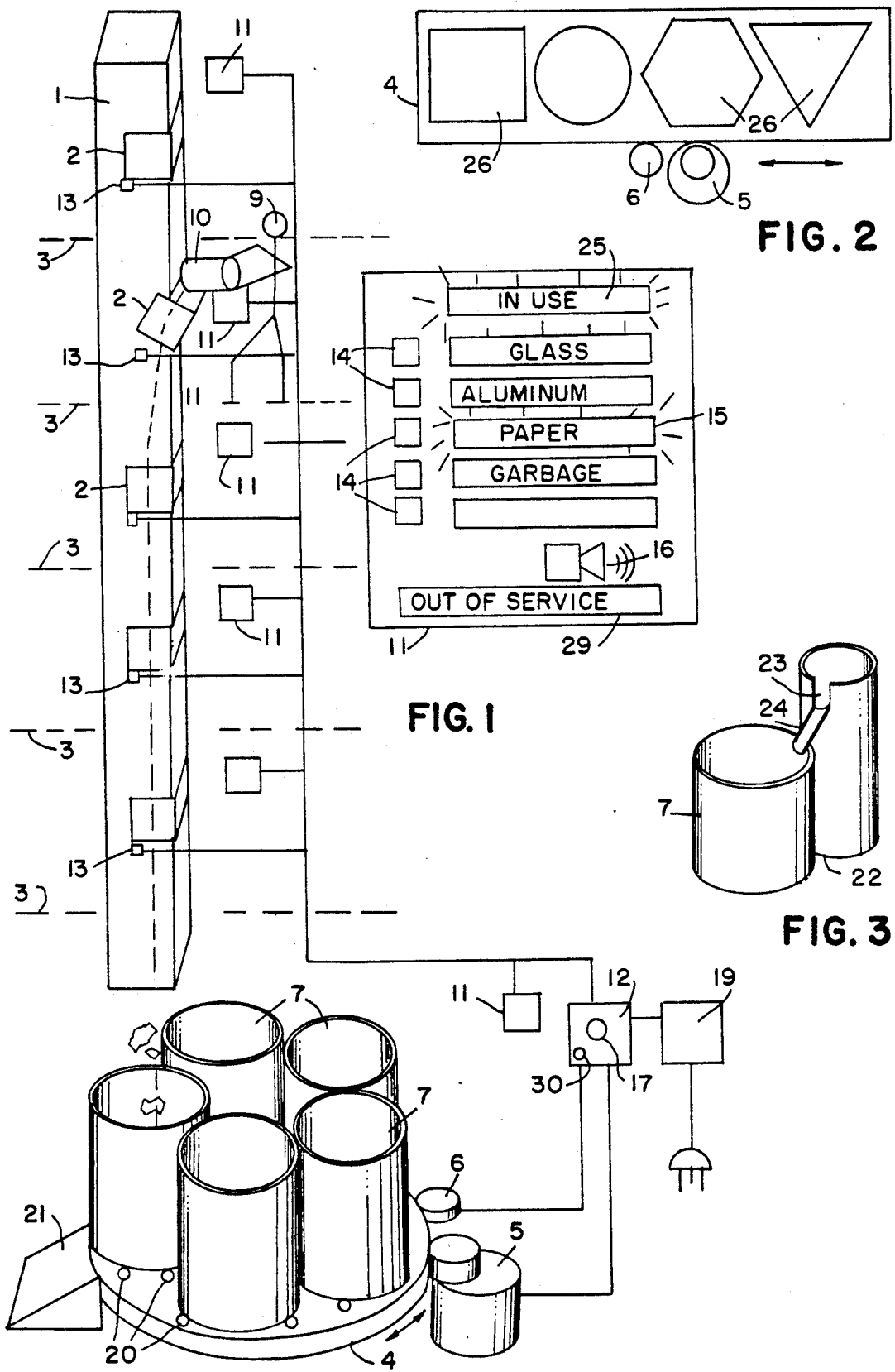

5,031,829

SEPARATED WASTE COLLECTION SYSTEM FOR MULTI-STORY BUILDING

BACKGROUND OF THE INVENTION

This invention relates to the separation of recyclable solid waste from non-recyclable solid waste at the source of disposal, (i.e., by the tenant) in new and existing multi-story buildings that are equipped with trash chutes. More specifically, the invention relates to a tenant-controlled delivery system of different catagories of solid waste into multiple containers that are located on a moving system driven by a motor and that are positioned beneath the end of a single trash chute.

In the process of waste disposal, people are being required by the government, for political and economic reasons, to separate for recycling a large portion of their solid waste.

Although hundreds of programs exist for curbside residential and commercial waste separation for recycling, no practical, economic solution has been provided for the high rise building.

DESCRIPTION OF THE PRIOR ART

1. Existing Buildings

The most advanced waste collection for recycling in existing multi-story buildings are combinations of low-tech, mostly commingled, separation methods which are inaccessable for one reason or another. The three main methods currently utilized are as follows:

a. Non-Commingled separation on each floor

Tenants separate recyclables in different non-commingled containers on each floor for later removal by building employees. Several containers are needed on each floor and employees must gather these containers to a single central location on the ground floor for later removal by the hauler.

b. Commingled separation on each floor

Tenants collect recyclables in a single commingled container on each floor for building employees or the hauler to separate at a later date. Employees must gather the containers from each floor in a single central location on the ground floor for later removal by the hauler.

c. Non-Commingled or commingled separation at a single central location

Tenants carry containers of non-commingled or commingled recyclables to a single central location on the ground floor for removal by the hauler.

The first method (a) is convenient to the tenant, but is costly in on-going labor and equipment.

The second method (b) is convenient to the tenant, less costly for equipment than the first, but still expensive, and exorbitant in on-going labor costs.

The third method (c) causes the least expense for equipment but causes enormous inconvenience to the tenant expecting the tenant to carry their recycled solid waste to a single central location on the ground floor.

Additionally, all three methods will require someone to transport solid waste in the elevators or stairwells continuously, a clearly unacceptable long term solution.

d. Sub-division of existing chute

The mechanical subdivision of an existing trash chute into multiple smaller chutes has been researched by the applicant. All chute sub-division possibilities violate the National Fire Association guidelines (NFA-82) and local fire codes because the resultant chutes are too small in cross section.

The current methods of collecting recyclables in multi-story buildings are expensive, time consuming, labor intensive, inconvenient to the tenants and ineffective.

2. New Construction

The most advanced known method of multi-story separated waste collections for recycling in new buildings consists of installing multiple chutes, one chute for each type of separated waste, such as glass, paper, aluminum and the like. This method takes up a great deal of space, is expensive, requires commingling of recyclables if less than the bare minimum of five chutes are used (three chutes are currently proposed as a standard) and is not expandable to a larger number of separate categories in the future. In short, this method is nearly as limiting as the currently used one-chute system.

The current methods consistantly show low generation rates and low participation because they ignore the tenant as the primary separator of solid wastes.

SUMMARY OF THE INVENTION

It is accordingly an object of the invention to provide a system that allows the tenant to separate non-commingled recyclables conveniently by duplicating the current habitual act of carrying a basket of waste to the trash chute and dumping the waste.

By causing the tenant to separate recyclables, the invention avoids the labor cost to separate recyclables later, avoids the labor cost to pick up containers on each floor, and avoids the labor cost of consolidating the waste at a single central location.

Using this invention, the containers of recyclables may be rolled and lifted onto a simple flatbed trailer attached to an existing front end loader garbage truck and the containers of non-recyclables may be dumped into the garbage truck. This allows for removal of recyclables and non-recyclables from the building at the same time using existing equipment at reduced labor costs.

The system of the invention includes a single vertical waste chute accessed by a door at each floor to take advantage of existing structures and reduce costs in new construction. At the bottom of the chute, a motor moves a plurality of waste receptacles, one dedicated to each type of waste. Control means at each floor selects a particular receptacle to be moved to a position beneath the chute to receive a particular type of waste material.

Controls and interconnecting means prevent movement when a door is open, indicate to each floor which receptacle is beneath the chute at any time to prevent errors, and prevent conflicts of control between floors. The access doors are provided with automatic closers well known in the art.

These and other objects, advantages and features of the invention will become apparent when the detailed description is considered in conjunction with the drawings.

BRIEF DESCRIPTION OF THE DRAWINGS

FIG. 1 is a perspective view, partially diagrammatic and not all to the same scale, of the system of the invention with a turntable platform and one control panel greatly enlarged.

FIG. 2 is a plan view of a rectilinear platform of the invention.

FIG. 3 is a perspective view of two receptacles of the invention with overflow features.

DETAILED DESCRIPTION OF THE PREFERRED EMBODIMENTS

Referring now first to FIG. 1, a waste chute 1 has an access door 2 on each floor 3 of a multi-story building. These structures may be of the type well known in the art. To dispose of waste, a tenant 9 carries a container 10 of separated waste to the access door 2 on his floor. At control panel 11 adjacent the door, he pushes pushbutton 14 to select a receptacle 7 in the basement to correspond to the type of waste he wishes to dispose (paper in this case). All the control panels 11 are operatively connected to central control 12. Beneath the chute 1, in the basement, a platform 4 holds a set of waste receptacles 7, one for each type of separated waste, such as clear glass, colored glass, aluminum, paper and all other wastes or garbage. The movable platform 4 is a turntable that is rotated by motor 5. A position sensor 6 senses the rotary position of the platform 4. The central control 12 operates the motor 5 that cooperates with the position sensor 6 in a servo relationship to rotate the platform 4 until the selected (Paper) receptacle is directly beneath chute 7.

A door sensor and lock assembly 13 at each door 2 is also connected to the central control 12. While the platform is moving, the central control 12 actuates all the door locks to prevent waste falling while receptacles are moving. If any door is open, its door sensor will communicate that information to the central control 12 which will inhibit operation of motor 5 and platform motion.

When the selected receptacle is in position as determined by position sensor 6, the motor 5 stops, the lock at the door of the user opens and the selected item 15 on every control panel 11 lights up. A sonic indicator 16 sounds to notify that the system is ready to receive the selected waste. After a preselected time interval during which the door has remained closed, all the doors unlock so that another floor can use the system.

When any door is locked, all the other doors are locked and the "in use" light 25 on each panel is illuminated. A duplicate panel 11 in the basement facilitates service. In addition, a control switch 17 provides for disabling the controls on the floors while emptying the receptacles, which illuminates the "out of service" lights 29. A power supply 19 for the system is powered by the line power and the electronic controls in the central control 12 may be of the programmed microprocessor type with multiple inputs that is well known in the art.

The receptacles 7 may be provided with wheels 20 for ease in rolling down ramp 21 when full.

As shown in FIG. 2, the moving platform 4 may be of the rectilinear type that moves back and forth in a straight line to better accomodate space and geometry requirements of certain installations. As shown, the platform 4 may have a plurality of shallow, uniquely-shaped recesses 26 in its upper surface for receiving a corresponding set of uniquely shaped receptacles (not shown This feature ensures correct positioning of particular receptacles.

Referring now to FIG. 3, certain containers 22 may be taller and of smaller diameter with a notch 23 cut into the upper opening. This notch 23 holds a trough 24 that leads to the much larger and lower garbage receptacle 7.

When the low-volume, low-use receptacle is full, the excess will flow into the much larger garbage receptacle. This option permits use of larger receptacles for high volume items and smaller receptacles for low volume use for more efficient platform space utilization without fear of overflow.

A distinct advantage of a programmable microprocessor with multiple inputs and outputs in the central control 12 of FIG. 1 is that provisions can be made at negligible cost for the future inclusion of additional categories of separated wastes. If a category is added, then an additional pushbutton and light for that category must be added at each control panel and the necessary wiring connections made. The cost of adding extra categories will be even less if the initial installation is made with the wiring, pushbutton and lights for several extra categories and the final connections at the central control 12 placed on internal switches is well known in the art. In that case, adding a category simply involves applying labels to the lights on each control panel 11, and opening the central control 12 to operate a concealed switch 30 to complete the connection.

The particular sequences of operation, timing intervals and the like are controlled by the program in the microprocessor. The manufacturer of the system may provide various options that may be implemented by simply replacing the program. This may involve replacing a separate program module or the microprocessor module when the program is on the chip with the microprocessor. The program may include various options such as a default position wherein the garbage receptacle is moved into position when there is, for example, a problem with locking a door.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

I claim:

1. A system for selective, separated collection of waste that has been separated into a plurality of categories in a building having a plurality of stories or floors that employs a chute with an access door that accesses said chute at each floor from which waste is to be collected, the system comprising:

(A) receptacle moving means for moving a selected one of a plurality of waste collection receptacles beneath said chute to receive a particular category of waste deposited through an access door;

(B) control means for controlling said receptacle moving means, said control means including selection means for selecting said particular category and indicating means for indicating the selected category, said selection means and said indicating means located in the proximity of each said access door, said control means operatively connected to said receptacle moving means for selectively controlling said moving means; and (C) door locking means connected to each said door for locking said door while said receptacle moving means is in motion, said door locking means operatively connected to said control means.

2. The system according to claim 1, further comprising door sensing means at each said access door for sensing when said door is open, said door sensing means operatively connected to said control means for affecting operation based on the condition of a door being open.

3. The system according to claim 2, in which said control means locks all the said access doors except that particular door adjoining a selection means from which a selection has been most recently made for a predetermined time interval related to the opening of said particular door.

4. The system according to claim 1, in which said receptacle moving means includes a platform of the turntable type.

5. The system according to claim 1, in which said receptacle moving means includes a platform provided with rectilinear motion.

6. The system according to claim 1, in which said receptacle moving means includes category means for ensuring that a receptacle dedicated for a particular category of waste is always located in a particular location in said receptacle moving means.

7. The system according to claim 6, in which said category means includes a moving platform with a top surface having uniquely shaped recesses therein and uniquely shaped receptacles fitting said recesses.

8. The system according to claim 1 including special receptacles having a notch in an upper edge and a trough for diverting overflow to a shorter receptacle.

9. A system for selective, separated collection of waste that has been separated into a plurality of categories in a building having a plurality of stories or floors, the system comprising:
(A) a vertical waste chute with an access door that communicates with said chute at each floor from which waste is to be collected;
(B) receptacle moving means for moving a selected one of a plurality of waste collection receptacles beneath said chute to receive a particular category of waste deposited through an access door;
(C) control means for controlling said receptacle moving means, said control means including selection means for selecting said particular category and indicating means for indicating the selected category, said selection means and said indicating means located in the proximity of each said access door, said control means operatively connected to said receptacle moving means for selectively controlling said moving means; and
(D) door locking means connected to each said door for locking said door while said receptacle moving means is in motion, said door locking means operatively connected to said control means.

10. The system according to claim 9, further comprising door sensing means at each said access door for sensing when said door is open, said door sensing means operatively connected to said control means for affecting operation based on the condition of a door being open.

11. The system according to claim 10, in which said control means locks all the said access doors except that particular door adjoining a selection from which a selection has been most recently made for a predetermined time interval related to the opening of said particular door.

12. The system according to claim 9, in which said receptacle moving means includes a platform of the turntable type.

13. The system according to claim 9, in which said receptacle moving means includes a platform provided with rectilinear motion.

14. The system according to claim 9, in which said receptacle moving means includes category means for ensuring that a receptacle dedicated for a particular category of waste is always located in a particular location in said receptacle moving means.

15. The system according to claim 14, in which said category means includes a moving platform with a top surface having uniquely shaped recesses therin and uniquely shaped receptacles fitting said recesses.

16. The system according to claim 9 including special receptacles having a notch in an upper edge and a trough for diverting overflow to a shorter receptacle.

17. A system for selective, separated collection of waste that has been separated into a plurality of categories in a building having a plurality of stories or floors that employs a chute with an access door that accesses said chute at each floor from which waste is to be collected, the system comprising:
(A) receptacle moving means for moving a selected one of a plurality of waste collection receptacles beneath said chute to receive a particular category of waste deposited through an access door; and
(B) control means for controlling said receptacle moving means, said control means including selection means for selecting said particular category and indicating means for indicating the selected category, said selection means and said indicating means located in the proximity of each said access door, said control means operatively connected to said receptacle moving means for selectively controlling said moving means.

18. The system according to claim 17, further comprising door sensing means at each said access door for sensing when said door is open, said door sensing means operatively connected to said control means for affecting operation based on the condition of a door being open.

19. The system according to claim 18, in which said control means locks all the said access doors except that particular door adjoining a selection means from which a selection has been most recently made for a predetermined time interval related to the opening of said particular door.

20. The system according to claim 17, in which said receptacle moving means includes a platform of the turntable type.

21. The system according to claim 17, in which said receptacle moving means includes a platform provided with rectilinear motion.

22. The system according to claim 17, in which said receptacle moving means includes category means for ensuring that a receptacle dedicated for a particular category of waste is always located in a particular location in said receptacle moving means.

23. The system according to claim 22, in which said category means includes a moving platform with a top surface having uniquely shaped recesses therein and uniquely shaped receptacles fitting said recesses.

24. The system according to claim 17 including special receptacles having a notch in an upper edge and a trough for diverting overflow to a shorter receptacle.

25. A system for selective, separated collection of waste that has been separated into a plurality of categories in a building having a plurality of stories or floors that employs a chute with an access door that accesses said chute at each floor from which waste is to be collected, the system comprising:

(A) receptacle moving means for moving a selected one of a plurality of waste collection receptacles beneath said chute to receive a particular category of waste deposited through an access door; and (B) control means for controlling said receptacle moving means, said control means including selection means for selecting said particular category; said selection means located in the proximity of each said access door, and said control means operatively connected to said receptacle moving means for selectively controlling said moving means.

26. The system according to claim 25, further comprising door sensing means at each said access door for sensing when said door is open, said door sensing means operatively connected to said control means for affecting operation based on the condition of a door being open.

27. The system according to claim 26, in which said control means locks all the said access doors except that particular door adjoining a selection means from which a selection has been most recently made.

28. The system according to claim 25, in which said receptacle moving means includes a platform of the turntable type.

29. The system according to claim 25, in which said receptacle moving means includes a platform provided with rectilinear motion.

30. The system according to claim 25, in which said receptacle moving means includes category means for ensuring that a receptacle dedicated for a particular category of waste is always located in a particular location in said receptacle moving means.

31. The system according to claim 30, in which said category means includes a moving platform with a top surface having uniquely shaped recesses therein and uniquely shaped receptacles fitting said recesses.

32. The system according to claim 25, including special receptacles having a notch in an upper edge and a trough for diverting overflow to a shorter receptacle.

* * * * *